United States Patent
Diaz

(10) Patent No.: US 9,750,260 B2
(45) Date of Patent: Sep. 5, 2017

(54) SERPENTINE BAKING PAN AND METHOD OF USING THE SAME

(71) Applicant: InOvation Enterprises, Inc., Cincinnati, OH (US)

(72) Inventor: Jacqueline H. Diaz, Cincinnati, OH (US)

(73) Assignee: INOVATION ENTERPRISES, INC., Cincinnati, OH (US)

(*) Notice: Subject to any disclaimer, the term of this patent is extended or adjusted under 35 U.S.C. 154(b) by 28 days.

(21) Appl. No.: 14/744,260

(22) Filed: Jun. 19, 2015

(65) Prior Publication Data

US 2015/0373998 A1    Dec. 31, 2015

Related U.S. Application Data

(62) Division of application No. 11/866,431, filed on Oct. 3, 2007, now Pat. No. 9,060,521.

(60) Provisional application No. 60/828,669, filed on Oct. 9, 2006.

(51) Int. Cl.
| | |
|---|---|
| *A21B 5/00* | (2006.01) |
| *A21B 3/13* | (2006.01) |
| *A23P 30/10* | (2016.01) |
| *A23L 5/10* | (2016.01) |

(52) U.S. Cl.
CPC ............ *A21B 5/00* (2013.01); *A21B 3/13* (2013.01); *A23L 5/10* (2016.08); *A23P 30/10* (2016.08); *A23V 2002/00* (2013.01); *Y10T 29/53* (2015.01)

(58) Field of Classification Search
CPC ... A21B 5/00; A23P 1/105; A23L 1/01; A23V 2002/00
USPC ........... D7/331, 354, 675, 676; 99/331, 426, 99/428, 440, 448, 449; 249/53 R, 95, 249/119, 135; 426/87, 104, 502
See application file for complete search history.

(56) References Cited

U.S. PATENT DOCUMENTS

| | | | | |
|---|---|---|---|---|
| D265,708 S | * | 8/1982 | O'Dell | D7/354 |
| 4,452,419 A | * | 6/1984 | Saleeba | A21B 3/13 249/119 |
| 4,644,858 A | * | 2/1987 | Liotto | A21B 3/137 219/725 |

* cited by examiner

*Primary Examiner* — Thien S Tran
(74) *Attorney, Agent, or Firm* — Jenei LLC; Stephen Jenei

(57) ABSTRACT

The present invention is a baking pan having a bottom connected to four side walls. One side wall is a semicircular side having a perimeter measuring about 180°. Another side wall is substantially straight and connected to the semicircular side. Another side wall is substantially straight side and connected to another end of the semicircular side. The fourth side wall is an arc side connecting the two substantially straight sides. One of the substantially straight sides is substantially equal in length to the radius of the arc side.

13 Claims, 6 Drawing Sheets

SERPENTINE BAKING PAN AND METHOD OF USING THE SAME

CROSS-REFERENCE TO RELATED APPLICATION

The present invention is a divisional of U.S. patent application Ser. No. 11/866,431, filed Oct. 10, 2007, now allowed, which claims priority to U.S. provisional Patent Application No. 60/828,669 as filed Oct. 9, 2006, both of which are herein incorporated by reference for all purposes.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to baking pans, and more particularly, to serpentine baking pans used to create and arrange prepared food dishes in a variety of shapes to serve multiples of people.

2. Description of the Related Art

Typically, baking pans come in simple geometric shapes such as, for example, squares, rectangles, and circles. Occasionally, baking pans may have more elaborate designs as often found with bundt cake pans, which are typically still circular in overall shape.

When baking prepared food dishes, such as, for example, cakes, there is sometimes the need and/or desire to produce a large enough cake to serve multiple people, yet still provide an elaborate and aesthetically pleasing design.

Such cakes are often present at special occasions such as weddings, in which tiered levels of cake may exist. However, arranging cakes and other prepared food dishes in such fashion can be a very delicate process and the tiers may fall, thereby causing a waste in food and diminishing the aesthetically pleasing appearance. As such, most elaborate prepared food dishes are produced and arranged by those individuals experienced with such work, and hiring such experienced individuals may be expensive.

Furthermore, preparing and baking large cakes and similar dishes can be difficult due to the need of a large oven that can evenly bake a large food dish. In addition, it can be awkward to transport such a large prepared food dish.

Thus, what is desired is a means of preparing and/or baking food dishes that can easily arranged in a variety of aesthetically pleasing arrangements, and can serve a large number of individuals.

SUMMARY

The various exemplary embodiments of the present invention include a baking pan comprised of a bottom connected to side walls. The side walls are comprised of a semicircular side having a first end, a second end, and a perimeter measuring about 180°, a first substantially straight side connected to a first end of the semicircular side and having a length at least substantially equal to a radius of the semicircular side, a second substantially straight side connected to a second end of the semicircular side and having a length substantially equal to a radius of the semicircular side, and an arc side connecting the first substantially straight side to the second substantially straight side such that the second substantially straight side is substantially equal to the radius of the arc.

The various exemplary embodiments also include a method of assembling a prepared food dish. The method is comprised of baking the prepared food dish in three or more baking pans having substantially similar shape. Each of the baking pans is comprised of a bottom connected to side walls. The side walls of the baking pans are comprised of a semicircular side having a first end, a second end, and a perimeter measuring about 180°, a first substantially straight side connected to a first end of the semicircular side and having a length at least substantially equal to a radius of the semicircular side, a second substantially straight side connected to a second end of the semicircular side and having a length substantially equal to a radius of the semicircular side, and an arc side connecting the first substantially straight side to the second substantially straight side such that the second substantially straight side is substantially equal to the radius of the arc. After baking, the prepared food dishes are removed from the baking pans, and the prepared food dishes are arranged such that the first substantially straight side of one prepared food dish is adjacent to the second substantially straight side of another prepared food dish.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

Figure 1:
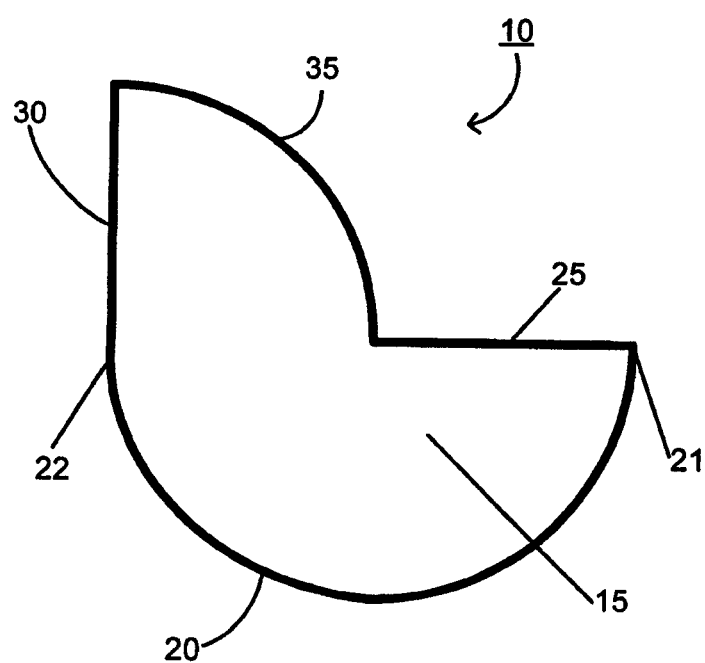
FIG. 1 is an illustration of a top view of an exemplary embodiment of the present invention.

In reference to the drawings, similar reference characters denote similar elements throughout all the drawings. The following is a list of the reference characters and associated element:

10 baking pan
15 bottom
20 semicircular side
21 first end 22 second end
25 first substantially straight side
30 second substantially straight side
35 arc side

DETAILED DESCRIPTION

The various exemplary embodiments of the present invention will now be described more fully hereinafter with reference to the accompanying drawings, in which some, but not all, of the embodiments of the inventions are shown. Identified like elements of the present invention are identified with like numbers throughout the drawings.

The various exemplary embodiments of the present invention include a baking pan in which food dishes may be prepared and/or baked, and then arranged in a variety of larger shapes.

In the various exemplary embodiments of the present invention, the baking pan may be composed of metal, alloy, ceramic, silicone, or a combination thereof.

The baking pan 10 of the exemplary embodiments is comprised of a bottom 15 connected to side walls. In preferred exemplary embodiments, there are four side walls connected to the bottom.

One of the side walls is a semicircular side 20 having a first end 21, a second end 22, and a perimeter measuring about 180°.

In a preferred embodiment, there is a first substantially straight side 25 connected to a first end 21 of the semicircular side 20 and having a length at least substantially equal to a radius of the semicircular side.

It is preferred in exemplary embodiments that there is also a second substantially straight side 30 connected to a second end 22 of the semicircular side 20 and having a length substantially equal to a radius of the semicircular side.

In the various exemplary embodiments, there is an arc side 35 connecting the first substantially straight side 25 to the second substantially straight side 30 such that the second substantially straight side 30 is substantially equal to the radius of the arc.

In exemplary embodiments, the arc side measures between about 60° and about 154° of a circle.

Figure 2:
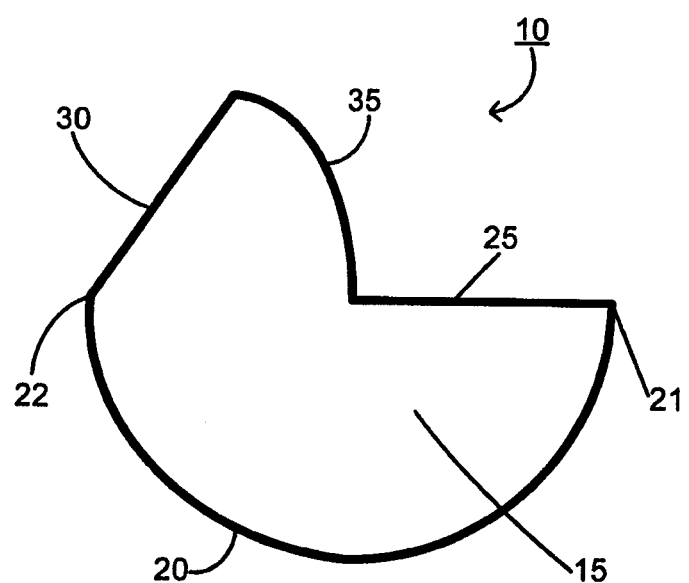
FIG. 2 is an illustration of a top view of another exemplary embodiment of the present invention.

For example, in the exemplified embodiment shown in FIG. 1., the arc side measures about 90°. In FIG. 2, the arc side measures about 60°, and in FIG. 3, the arc side measures about 108°.

The first substantially straight side and the arc side are connected substantially at a central angle of the semicircular side in an exemplary embodiment represented in FIG. 1.

Once the food dish is prepared and/or baked in the baking pan according to the various exemplary embodiments of the present invention, the prepared food dish may be removed from the pan and arranged in a variety of shapes, based partially upon the shape of the respective baking pan.

Figure 4:
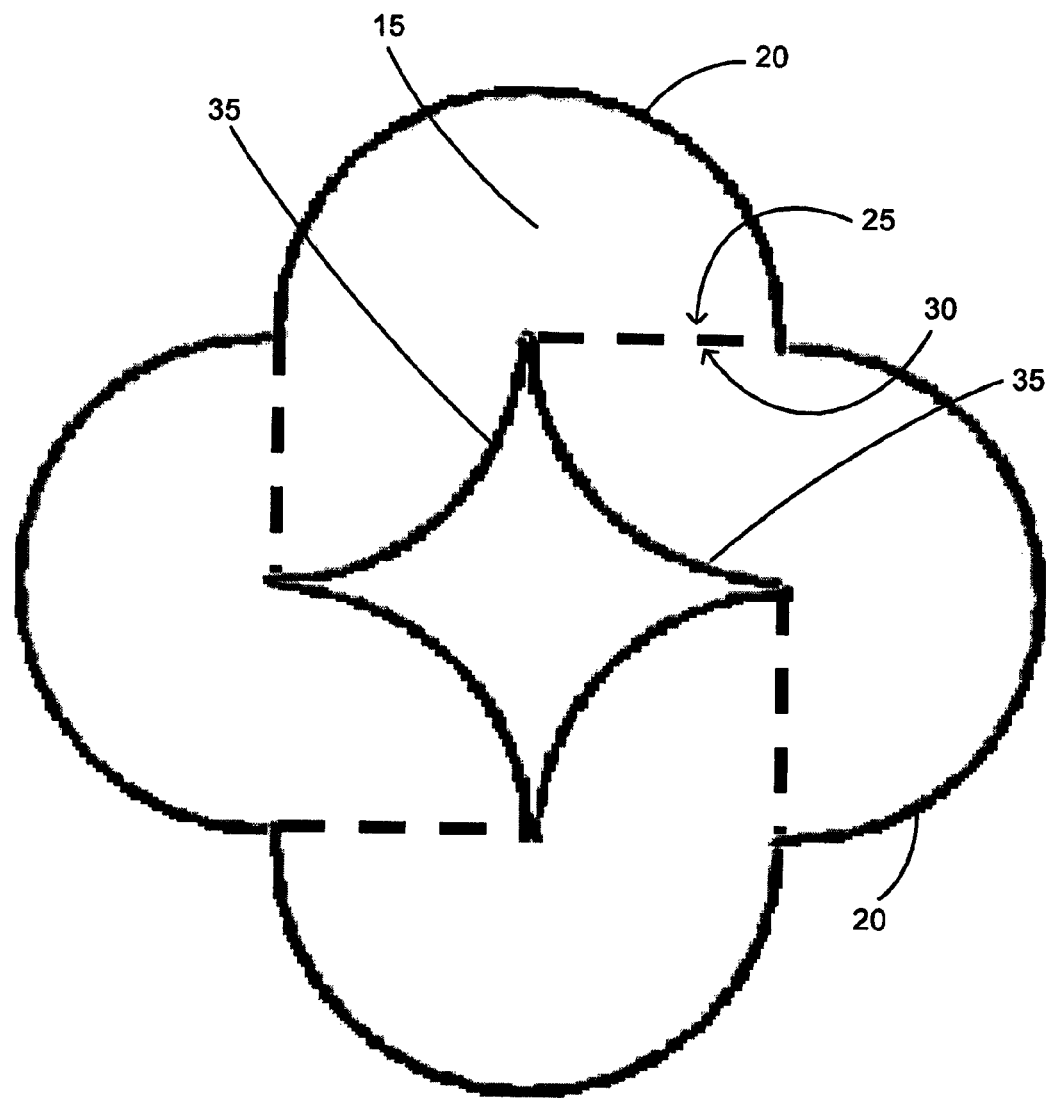
FIG. 4 is an illustration of an exemplary arrangement of multiple exemplary embodiments of the present invention.

In an exemplary embodiment represented in FIG. 4, four food dishes prepared and baked in baking pans similar to the embodiment represented in FIG. 1 are arranged such that the first substantially straight side 25 of one prepared food dish is adjacent to the second substantially straight 30 side of another prepared food dish.

Figure 5:
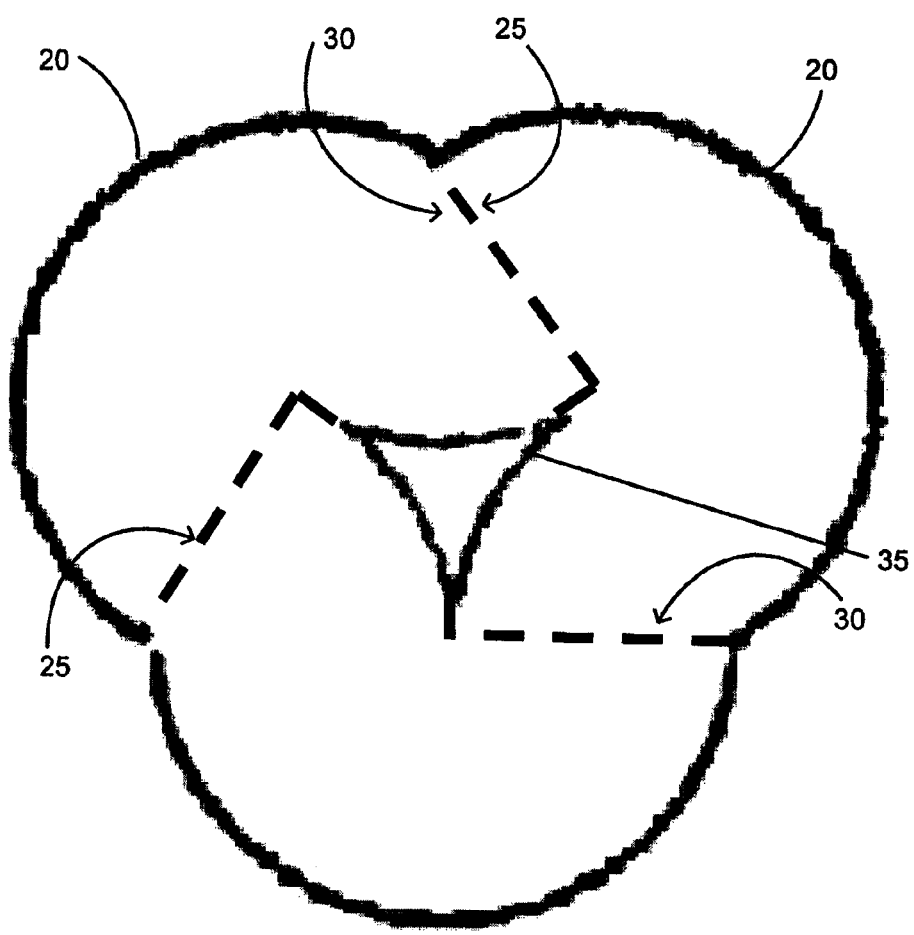
FIG. 5 is an illustration of another exemplary arrangement of multiple exemplary embodiments of the present invention.

In another exemplary embodiment represented in FIG. 5, three food dishes prepared and baked in baking pans similar to the embodiment represented in FIG. 2 are arranged such that the first substantially straight side 25 of one prepared food dish is adjacent to the second substantially straight 30 side of another prepared food dish.

Figure 3:
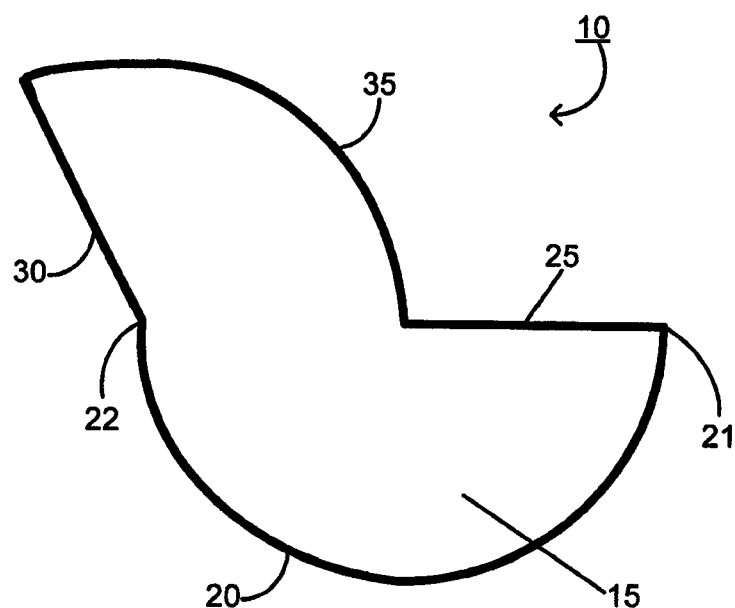
FIG. 3. is an illustration of a top view of yet another exemplary embodiment of the present invention.
Figure 6:
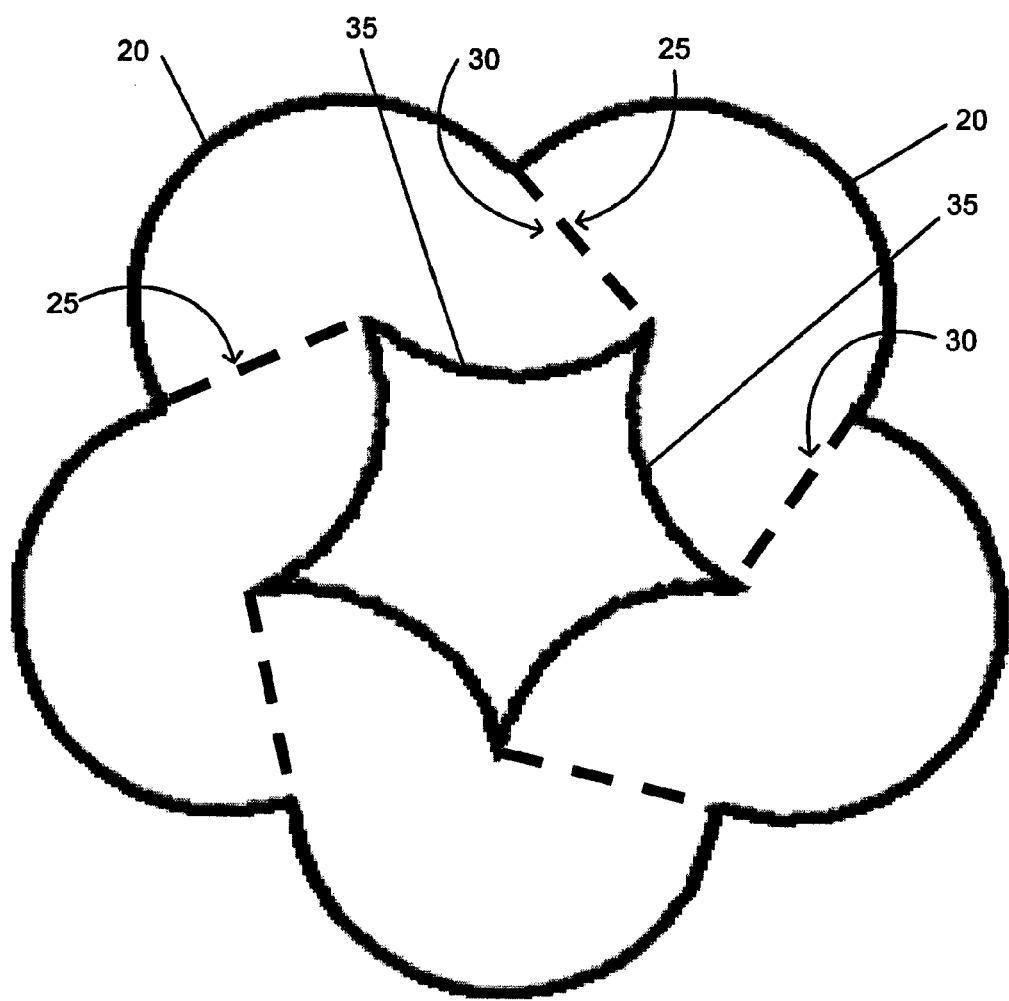
FIG. 6 is an illustration of yet another exemplary arrangement of multiple exemplary embodiments of the present invention.

In yet another exemplary embodiment represented in FIG. 6, five food dishes prepared and baked in baking pans similar to the embodiment represented in FIG. 3 are arranged such that the first substantially straight side 25 of one prepared food dish is adjacent to the second substantially straight 30 side of another prepared food dish.

The food dishes prepared and baked in baking pan according to the various exemplary embodiments here may be arranged such that the first substantially straight side of one prepared food dish is adjacent to the first substantially straight side of another prepared food dish, and the second substantially straight side of the one prepared food dish is adjacent to the second substantially straight side of yet another prepared food dish.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

The invention claimed is:

1. A method of assembling a prepared food dish, the method comprised of:
    preparing, baking, or a combination there of, of a food dish in three or more identical baking pans having substantially similar shape, each of the baking pans comprised of:
        a bottom connected to side walls, the side walls comprised of:
            a semicircular side having a first end,
            a second end, and
            a perimeter measuring about 180°;
        a first substantially straight side connected to a first end of the semicircular side and having a length at least substantially equal to a radius of the semicircular side;
        a second substantially straight side connected to a second end of the semicircular side and having a length substantially equal to a radius of the semicircular side; and
        an arc side connecting the first substantially straight side to the second substantially straight side such that the second substantially straight side is substantially equal to the radius of the arc;
    removing the prepared food dishes from the baking pans; and
    arranging the prepared food dishes such that the first substantially straight side of one prepared food dish is adjacent to the second substantially straight side of another prepared food dish, wherein a spatial relationship between the first and second substantially straight sides and a number of the three or more food dishes is selected to form a closed serpentine shape from the arranged and prepared food dishes.

2. The method according to claim 1, wherein the arc side measures between about 60° and about 154°, wherein the angle corresponds to the number of the prepared food dishes to form the closed serpentine shape.

3. The baking pan according to claim 1, wherein the arc side measures about 60° and the number of arranged and prepared food dishes is 3.

4. The method according to claim 1, wherein the arc side measures about 90° and the number of arranged and prepared food dishes is 4.

5. The method according to claim 1, wherein the arc side measures about 108° and the number of arranged and prepared food dishes is 5.

6. The method according to claim 1, wherein the first substantially straight side and the arc side are connected substantially at a central angle of the semicircular side.

7. A method of assembling a prepared food dish, the method comprised of:
 preparing, baking, or a combination there of, of a food dish in three or more identical baking pans having substantially similar shape, each of the baking pans comprised of:
  a bottom connected to side walls, the side walls comprised of:
   a semicircular side having a first end,
   a second end, and
   a perimeter measuring about 180°;
  a first substantially straight side connected to a first end of the semicircular side and having a length at least substantially equal to a radius of the semicircular side;
  a second substantially straight side connected to a second end of the semicircular side and having a length substantially equal to a radius of the semicircular side; and
  an arc side connecting the first substantially straight side to the second substantially straight side such that the second substantially straight side is substantially equal to the radius of the arc;
 removing the prepared food dishes from the baking pans; and
 arranging the prepared food dishes such that the first substantially straight side of one prepared food dish is adjacent to the first substantially straight side of another prepared food dish, and the second substantially straight side of the one prepared food dish is adjacent to the second substantially straight side of yet another prepared food disk wherein a spatial relationship between the first and second substantially straight sides and a number of the three or more food dishes is selected to form a closed serpentine shape from the arranged and prepared food dishes.

8. The method according to claim 7, wherein the arc side measures between about 60° and about 154°, wherein the angle corresponds to the number of the food dishes to form the closed serpentine shape.

9. The baking pan according to claim 7, wherein the arc side measures about 60° and the number of arranged and prepared food dishes is 3.

10. The method according to claim 7, wherein the arc side measures about 90° and the number of arranged and prepared food dishes is 4.

11. The method according to claim 7, wherein the arc side measures about 108° and the number of arranged and prepared food dishes is 5.

12. The method according to claim 7, wherein the first substantially straight side and the arc side are connected substantially at a central angle of the semicircular side.

13. The method according to claim 7, wherein the baking pan is composed of metal, alloy, ceramic, silicone, or a combination thereof.

* * * * *